US012765549B2

(12) United States Patent
Huang et al.

(10) Patent No.: US 12,765,549 B2
(45) Date of Patent: *Oct. 20, 2026

(54) METHOD OF USING/APPLYING A KERATIN HYDROLYSIS PEPTIDE SOLUTION TO PROMOTE TOLERANCE OF SOYBEAN AND ITS GROWTH UNDER STRESS OF FLOODING

(71) Applicant: CH Biotech R&D Co., Ltd., Nantou City (TW)

(72) Inventors: Jenn Wen Huang, Taichung (TW); Ching-Chi Tsai, Taichung City (TW); Cyun-Jhe Yan, Taoyuan (TW)

(73) Assignee: CH Biotech R&D Co., Ltd., Nantou City (TW)

( * ) Notice: Subject to any disclaimer, the term of this patent is extended or adjusted under 35 U.S.C. 154(b) by 220 days.

This patent is subject to a terminal disclaimer.

(21) Appl. No.: 18/645,354

(22) Filed: Apr. 24, 2024

(65) Prior Publication Data

US 2025/0331517 A1 Oct. 30, 2025

(30) Foreign Application Priority Data

Dec. 8, 2023 (TW) ................................ 112147964

(51) Int. Cl.

*A01N 37/46* (2006.01)
*A01N 63/10* (2020.01)

(52) U.S. Cl.

CPC ............ *A01N 37/46* (2013.01); *A01N 63/10* (2020.01)

(58) Field of Classification Search

CPC .......... A01N 63/10; A01N 63/50; A01P 21/00
See application file for complete search history.

(56) References Cited

FOREIGN PATENT DOCUMENTS

| | | | | |
|---|---|---|---|---|
| ID | P202207467 A1 * | 11/2020 | | |
| WO | WO-2021224310 A1 * | 11/2021 | ......... | C07K 14/4741 |
| WO | WO-2023001946 A1 * | 1/2023 | ............... | C12N 9/54 |

* cited by examiner

*Primary Examiner* — Kyle A Purdy
(74) *Attorney, Agent, or Firm* — Jen-Feng Lee, Esq.

(57) ABSTRACT

Present invention teaches the method of using a keratin hydrolysis peptide ("KHP") solution to promote the growth of soybean plants under flood stress. By selectively choosing specific weights of feathers and water, and treating the mixture to a high-temperature high-pressure hydrolysis process, the resulting solution is confirmed to contain at least 253 peptides and then apply to the soil containing the soybean at a specific growth stage after germination. Optionally, the KHP solution can be diluted by water as disclosed in the application.

3 Claims, 4 Drawing Sheets

Specification includes a Sequence Listing.

METHOD OF USING/APPLYING A KERATIN HYDROLYSIS PEPTIDE SOLUTION TO PROMOTE TOLERANCE OF SOYBEAN AND ITS GROWTH UNDER STRESS OF FLOODING

PRIORITY CLAIM TO FOREIGN APPLICATION

Applicant hereby makes priority claim to a Taiwan application, number 112147964, having the Taiwan filing date of Dec. 8, 2023.

SEQUENCE LISTING/INCORPORATION BY REFERENCE

Table I (in Sequence Listing XML format) shows the at least 253 peptides and its annotated sequences for the solution generated in accordance with the disclosure of this application. The Sequence Listing XML file complies with the WIPO ST.26 requirements. Said XML copy, created on Mar. 17, 2024, is named Table-I-253_sequence and is 216 bytes in size.

Applicant hereby incorporates by reference said Sequence Listing XML file in its entirety as part of the disclosure and specification of the present application.

BACKGROUND OF THE INVENTION

Present invention disclosed and claimed the method and application of a keratin hydrolysis peptide ("KHP") solution to promote the tolerance and growth of soybean plants during the sowing period, so that the soybeans can grow in a flooded environment, improve soybean above-ground biomass and root system development.

Soybean is an annual herbal plant; it contains various proteins essential to human health; it is also a good base material for making animal feed as well as other derivative/additive food supplements. Worldwide, it is estimated that 100 million acres of soybean plants are constantly being planted, tended to and harvested. Due to the climate change of recent years, the soybean farming is facing more and more challenges. During the seedling stage, the above-ground development is slower than the under-ground root system. As such, the soil should not be too wet so that there is sufficient aeration to boost the root development, which will support later stage growth, including flowering and fruiting.

However, one of the recent threats is the excessive rain and flood brought on by the climate change. During the growth stages, if there are storms, excessive rains and floods, and with the farm land drainage capacities not designed to cope with the amount of water, many plants, including soybean, will suffer from lack of soil oxygen and the accumulation of certain toxic content in the such as $Mn^{2+}$ and $Fe^{2+}$, further causing the metabolism of the plants to fail and cell structure decay, and, worst of all, the death of the whole plants.

During the time of seeding and germination, if the soybean plants are flooded, the growth will be stunted, leading to many developmental defects, including the limited photosynthesis activities, lower chlorophyll counts, and insufficient nutrient intake and production to general healthy bio mass, both above-ground and under-ground.

When there are excessive rains and the soil is completely flooded, a soybean can survive between 48 to 96 hours. The range of survival time is further dependent on other factors such as temperature, moisture, cloudiness and the soil drainage efficiency. If the flooded time is longer than 6 days, there would be irreversible injury to the soybean's roots, leading to certain death of the plants.

Hydrolyzed keratin has long been used to strengthen hairs, reduce hair splitting and breakage. Other beneficial uses include skin moisturization and wound healing. Keratin hydrolysate has also been known to function as a biofertilizer, boosting plants' growth by enhancing the plants' ability to receive and utilize nutrients, including commonly applied fertilizers.

The inventors of present application researched and tested using a keratin hydrolysis peptide (KHP) solution and successfully promoted the resistance and tolerance of soybean to the flooded environment, substantially reduced the negative impact brought on by the excessive rain and water.

The KHP solution is made by a hydrolysis process using feathers and water, via a high-temperature and high-pressure process, resulting in a solution that has many beneficial applications in the fields of horticulture, agriculture and potentially other farming businesses.

Among the embodiments disclosed and claimed in this application, one specific embodiment used feathers only, without water, to be treated with the high-temperature and high-pressure process as taught herein to produce a specific version of the KHP solution.

As disclosed herein, the application of the KHP solutions can be done by infusing to the soil where the soybean seeds are planted

SUMMARY OF THE INVENTION

The keratin solution is primarily based upon feather, which contains 85-91% keratin, 13-15% organic nitrogen, 1.6-2% organic sulfur, as well as other materials. The high keratin content has drawn many prior researches that work to break down, by enzyme, chemical agents, or fermentation process, into peptides, amino acids and other smaller molecules that can be used for animal feeds, plant fertilizers, and cultivation bases.

Around 2019, Nurdiawati, et al, came up with a hydrolysis process, by the mixture of $\alpha$-amylase and protease to hydrolyze feather waste, resulting in a mixture of amino acids, fatty acids, and sugars. Nurdiawati experimented and adopted certain specific high-temperature and high-pressure setting in the hydrolysis process and discovered that the resulting solution, when mixed with some potassium and other minerals, can boost the growth of *Pogostemon cablin* and *Vigna radiata*, as reported in International Journal of Recycling or Organic Waste in Agriculture (8:221-232, 2019).

The inventors of present application, under the aegis of CH Biotech, developed and selected different feather and water compositions to perform the hydrolysis at higher temperature and higher-pressure setting, resulting with different keratin hydrolysis peptide ("KHP") solution that can be used on different crops/plants.

The selected embodiment of present invention uses a mixture of water and feathers, and subject the mixture to a thermal hydrolysis process to create KHP solutions based upon temperature/pressure parameters as noted below.

The inventors used Dionex UltiMate 3000 UPLC to separate the peptides; an analysis is done via Thermo Orbitrap Fusion Lumos Tribrid Orbitrap mass spectrometry to identify the peptides, which are then subsequently confirmed by looking up the BIOPEP-UWM database.

The KHP solutions derived according to the disclosure herein can be diluted with water by volume ratio of 10-500 (denoted as 10×-500×).

BRIEF DESCRIPTION OF DRAWINGS

The accompanying drawings, figures and tables, which are incorporated in and constitute a part of this specification, illustrate and exemplify the preferred embodiments of the invention. Together with the description, serve to explain the principles of the invention.

DETAILED DESCRIPTION OF THE INVENTION

Figure 1A:
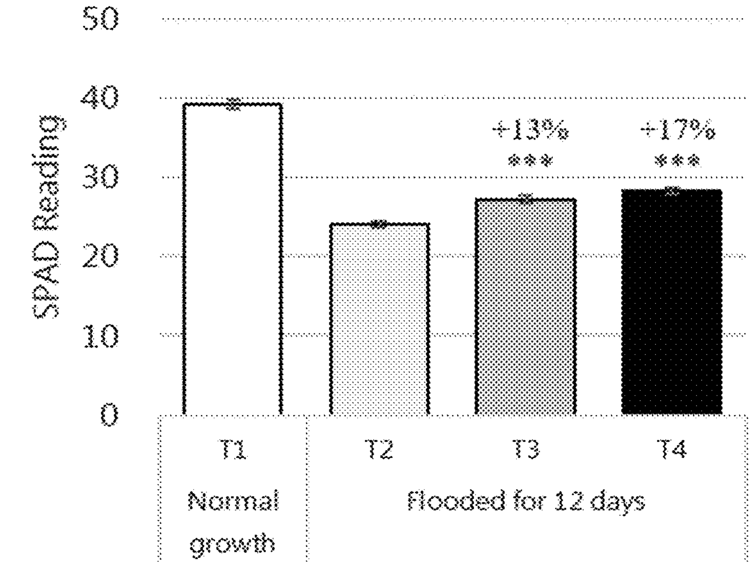
FIG. 1A shows the comparison of chlorophyll count (SPAD) among four groups.

The keratin hydrolysis peptide ("KHP") solution of present invention is made by a high-temperature and high-pressure process to treat a mixture of water and feathers as shown in the parameters herein.

The mixture ratio, temperature, pressure and duration parameters are shown herein:

To test the effectiveness of the method disclosed herein to combat the adversity of infliction by flooding, the inventors selected the soybean species of *Glycine max*, Kaohsiung No. 10, and planted the seeds in starter pots. The pots are placed in controlled room, with daytime temperature of 25° C., having 16 hours of light, at illumination of 600 μmole/m$^2$/s; the pots are given 8 night time hours, with temperature of 23° C.

During the germination stage, specifically six days after the seeding, the soybean plants are then divided into four (4) groups, referred to as T1, T2, T3 and T4.

T1 group contains soybean plants that will only experience normal growth environment.

T2, T3 and T4 group soybean plants will be flooded for 12 days, then returned to normal growth environment.

Each T3 group soybean plant pot is then infused with 50 ml of KHP 100× solution. Each T4 group soybean plant pot is then infused with 50 ml of KHP 50× solution.

T2 group soybean pots receive only water, 50 ml; no application of any KHP solution.

The testing setup for the four groups is summarized in the table below:

| | Description | Flood Environment | KHP solution |
|---|---|---|---|
| T1 | Normal growth | Normal growth | n/a |
| T2 | Check group | Flooded for 12 days | Water only, 50 ml |
| T3 | KHP 100x | | 50 ml |
| T4 | KHP 50x | | 50 ml |

It can be seen that the method of applying KHP solutions as disclosed herein effectively remedied the injuries caused by the flooding from the various indexes measured taken from the 4 groups.

| | Feather (kg) | Water (kg) | Water content in feather (%) | Pressure (kg/cm$^2$) | Temp. (° C.) | Time (min) | Mass (Da) | Concen. (ppm) |
|---|---|---|---|---|---|---|---|---|
| | 66 | 44 | 50% | 16 | 195 | 40 | 593.3~3828.0 | 200000 |
| KHP | 50 | 40 | 50% | 12 | 185 | 80 | 593.3~3508.9 | 301500 |
| | 70 | 0 | 46% | 13 | 180 | 40 | 705.9~3194.7 | 381250 |

The selected embodiment of the KHP solution takes the steps of:

a. Preparing the KHP solution by mixing 50 kg of feathers whose content is 50% water and 40 kg of water in a sealed container;

b. hydrolyzing the mixture in the container with a temperature and pressure setting of 185° C. and 12 kg/cm$^2$ for a duration of 80 minutes;

c. using a mass spectrometer to confirm the combination of peptides in the solution to contain at least 253 peptides as listed in the specification where their molecular masses are between 500 and 4,000 Daltons, and the concentration is in the range of $2.0\times10^5$~$4.5\times10^5$ ppm.

The keratin hydrolysis peptide (KHP) solution of the second embodiment is further filtered and concentrated to 301,500 ppm concentration.

The confirmation of some of the 253 peptides is further done by referencing the BIOPEP-UWM database.

KHP solution can be diluted with water by volume at the ratio of between 10 times to 500 times, denoted as 10×-500×, with a preferred narrower range of 50×-100×.

The inventors cut down leaves from the plants in the four groups and compute the total leaf area using WinFOLIA software (WinFOLIA Pro 2014a, Regent Instrument). The inventors conducted chlorophyll count by SPAD (Soil-Plant Analysis Development) analysis by using SPAD 502 Plus Chlorophyll Meter (2900PDL, Spectrum Technologies.) The inventors also took photos.

The inventors extracted and heat-dried the above-ground stalks, using digital scale (AP224X, Shimadazu) to measure the dry weights. The results are reflected in FIGS. 1A, 1B and 1C.

In FIG. 1A, the T3 group, where the flooded soybean was given KHP 100× solution at germination stage, show 13% more chlorophyll count than the T2 group, whereas the T4 group (given KHP 50× solution) shows 17% increase over that of the T2 group.

Figure 1B:
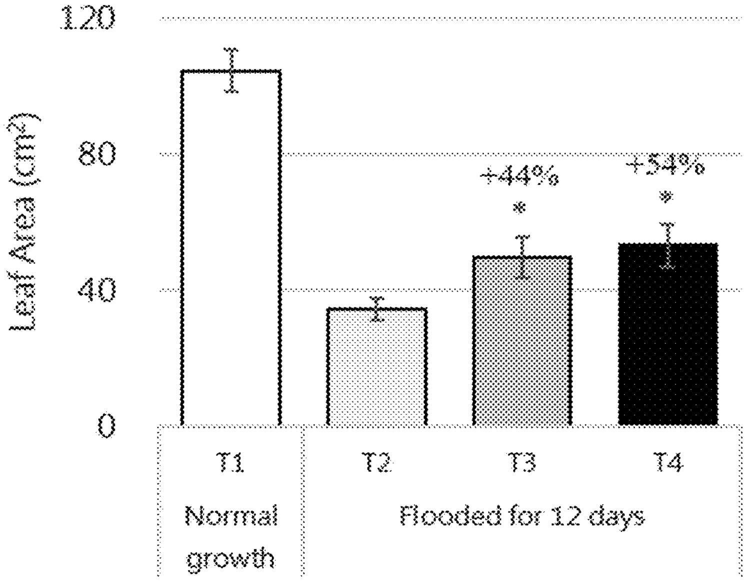
FIG. 1B shows the comparison of total leaf surface areas among four groups.

In FIG. 1B, the T3 group shows 44% increase of leaf surface area over that of the T2 group, whereas the T4 group shows a whopping 54% increase.

Figure 1C:
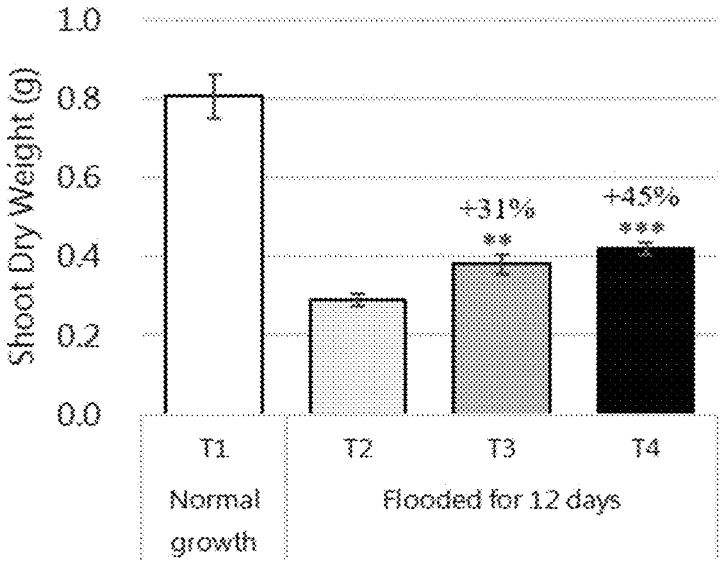
FIG. 1C shows the comparison of above-ground biomass dry weights among four groups.

In FIG. 1C, the T3 group shows 31% increase of above-ground dry weight over that of the T2 group, with the T4 group shows 45% more than that of the T2 group.

In checking the root systems' development, the inventors extracted the roots from all the four groups, cleaned them and took some measurements to check the effectiveness of KHP solution application to remedy the injuries caused by flooding.

The inventors used EPSON Expression 11000XL scanner to scan the roots, and ran the analysis by WinRHIZO software to obtain the total root length and splitting counts. The digital scale (AP224X, Shimadazu) is again used to measure the (dry) weights. The widths of the hypocotyl are measured with a sliding ruler. The results are noted in FIGS. 2A, 2B, 2C and 2D.

Figure 2A:
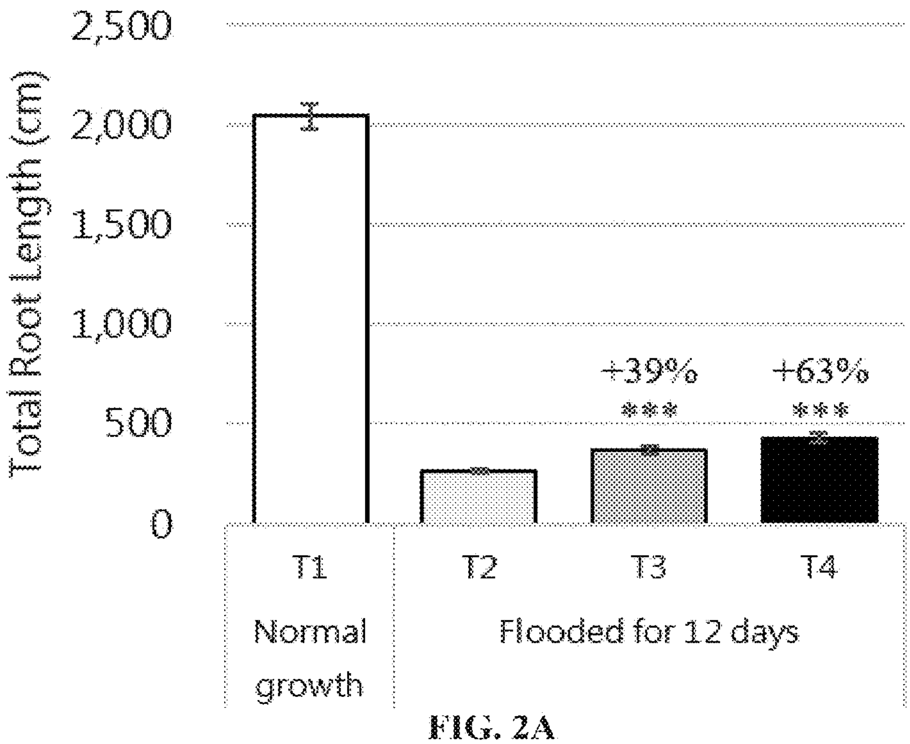
FIG. 2A shows the comparison of total root lengths among four groups.

FIG. 2A shows that the comparison of total root lengths. The T3 group (KHP 100×) is 39% over that of T2 group, with T4 group shows an impressive 63% increase over that of the T2 group.

Figure 2B:
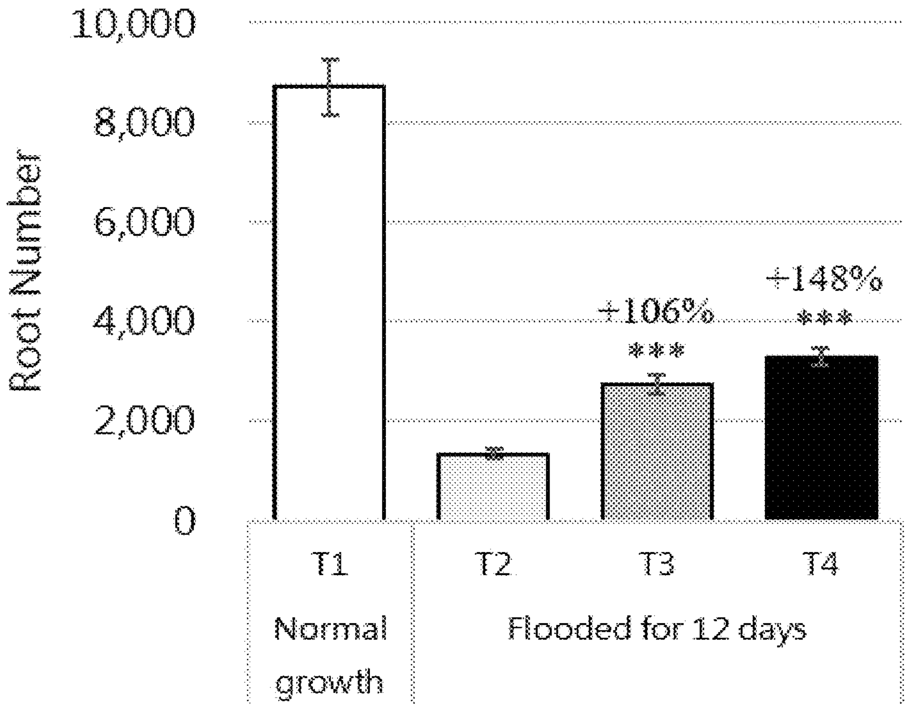
FIG. 2B shows the comparison of root splitting counts among four groups.

FIG. 2B shows the comparison of root splitting counts. Both T3 and T4 groups show over 100% increase, with T3 at 106% and T4 at 148%.

Figure 2C:
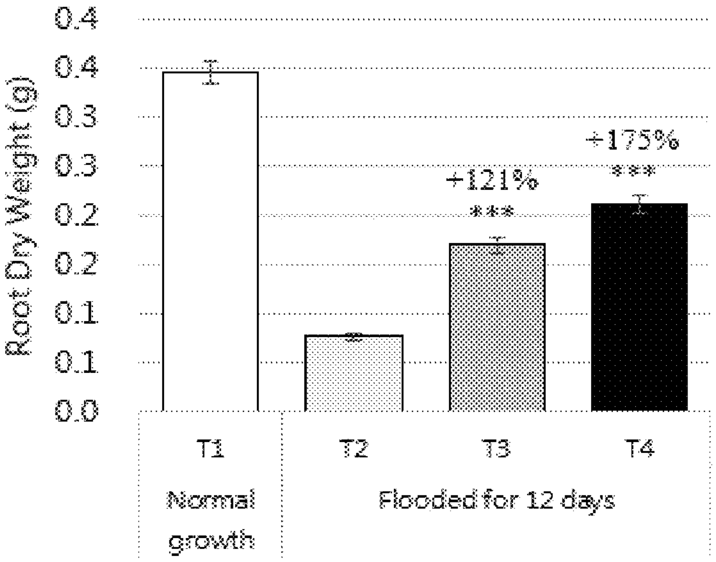
FIG. 2C shows the comparison of root dry weights among four groups.

FIG. 2C shows the comparison of root dry weights. The T4 group is 175% of that of the weight of the T2 group and T3 group is 121%.

Figure 2D:
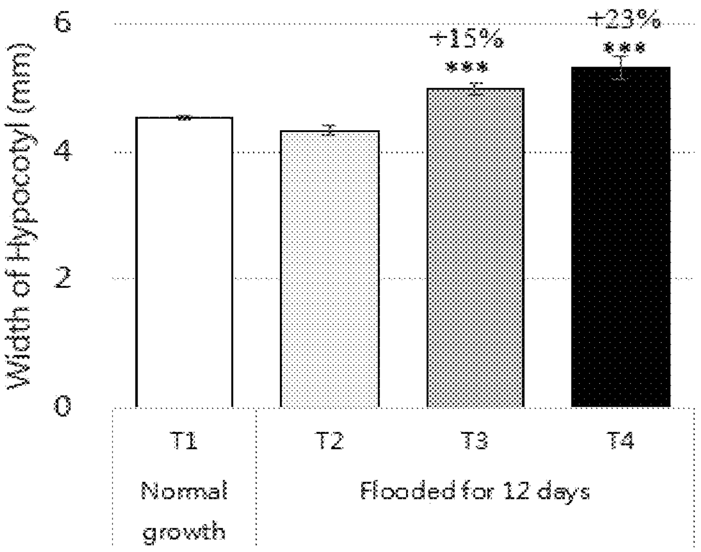
FIG. 2D shows the comparison of the width of the hypocotyl.

FIG. 2D shows the comparison of the widths of the hypocotyl. T3 group shows 15% increase and T4 group shows 23% increase over that of the T2 group. Notably, hypocotyl width readings in T3 and T4 are better than T1 group, which did NOT suffer the flooding adversity.

As shown in the tests conducted by the inventors, the application of the KHP solution at the germination stage effectively reduced the adverse effect of flooding by promoting the stress tolerance of soybean.

While the disclosure herein gave limited teachings and embodiment examples, it should be noted that the description and disclosure made herein illustrated the preferred embodiments of the invention and are not meant to limit the scope of the applicant's rights. Variations and alterations may be employed for yet additional embodiments without departing from the scope of the invention herein.

The invention claimed is:

1. A method of using a keratin hydrolysis peptide (KHP) solution to promote the soybean's tolerance and growth under stress of flooding, comprising the steps of:

a. preparing the KHP solution by mixing 50 kg of feathers having a water content of 50% by mass and 40 kg of water in a sealed container;

b. hydrolyzing the mixture in the container with a temperature and pressure setting of 185° C. and 12 kg/cm$^2$ for a duration of 80 minutes;

c. using a mass spectrometer to confirm that the combination of peptides in the solution comprises 253 peptides set forth as SEQ ID NOs: 1-253, wherein the peptides in the solution have molecular masses ranging between 500 and 4,000 Daltons and a combined concentration in the range of $2.0\times10^5$~$4.5\times10^5$ ppm; and d. applying the KHP solution to soil containing germinating soybean seedlings.

2. The method of using a keratin hydrolysis peptide solution of claim 1, wherein the solution is diluted with water by volume at the ratio of 1:10-500.

3. The method of using a keratin hydrolysis peptide solution of claim 2, wherein the solution is further diluted with water by volume at the ratio of 1:50-100.

* * * * *

SEQUENCE LISTING

```
Sequence total quantity: 253
SEQ ID NO: 1            moltype = AA  length = 6
FEATURE                 Location/Qualifiers
source                  1..6
                        mol_type = protein
                        organism = Gallus gallus
SEQUENCE: 1
FGLSGL                                                              6

SEQ ID NO: 2            moltype = AA  length = 7
FEATURE                 Location/Qualifiers
source                  1..7
                        mol_type = protein
                        organism = Gallus gallus
SEQUENCE: 2
AAVGSSL                                                             7

SEQ ID NO: 3            moltype = AA  length = 7
FEATURE                 Location/Qualifiers
source                  1..7
                        mol_type = protein
                        organism = Gallus gallus
SEQUENCE: 3
TAVGSST                                                             7

SEQ ID NO: 4            moltype = AA  length = 6
FEATURE                 Location/Qualifiers
source                  1..6
                        mol_type = protein
                        organism = Gallus gallus
SEQUENCE: 4
LSLSSQ                                                              6

SEQ ID NO: 5            moltype = AA  length = 7
FEATURE                 Location/Qualifiers
source                  1..7
                        mol_type = protein
                        organism = Gallus gallus
SEQUENCE: 5
FGISGLG                                                             7

SEQ ID NO: 6            moltype = AA  length = 6
FEATURE                 Location/Qualifiers
source                  1..6
                        mol_type = protein
                        organism = Gallus gallus
SEQUENCE: 6
PILSSF                                                              6

SEQ ID NO: 7            moltype = AA  length = 7
FEATURE                 Location/Qualifiers
```

-continued

```
source                 1..7
                       mol_type = protein
                       organism = Gallus gallus
SEQUENCE: 7
SLLSQGA                                                                    7

SEQ ID NO: 8           moltype = AA  length = 6
FEATURE                Location/Qualifiers
source                 1..6
                       mol_type = protein
                       organism = Gallus gallus
SEQUENCE: 8
FNLRGA                                                                     6

SEQ ID NO: 9           moltype = AA  length = 8
FEATURE                Location/Qualifiers
source                 1..8
                       mol_type = protein
                       organism = Gallus gallus
SEQUENCE: 9
SAAVGSSL                                                                   8

SEQ ID NO: 10          moltype = AA  length = 6
FEATURE                Location/Qualifiers
source                 1..6
                       mol_type = protein
                       organism = Gallus gallus
SEQUENCE: 10
SRVVIQ                                                                     6

SEQ ID NO: 11          moltype = AA  length = 6
FEATURE                Location/Qualifiers
source                 1..6
                       mol_type = protein
                       organism = Gallus gallus
SEQUENCE: 11
SRVVLE                                                                     6

SEQ ID NO: 12          moltype = AA  length = 8
FEATURE                Location/Qualifiers
source                 1..8
                       mol_type = protein
                       organism = Gallus gallus
SEQUENCE: 12
GFGISGLG                                                                   8

SEQ ID NO: 13          moltype = AA  length = 6
FEATURE                Location/Qualifiers
source                 1..6
                       mol_type = protein
                       organism = Gallus gallus
SEQUENCE: 13
SRFSGR                                                                     6

SEQ ID NO: 14          moltype = AA  length = 6
FEATURE                Location/Qualifiers
source                 1..6
                       mol_type = protein
                       organism = Gallus gallus
SEQUENCE: 14
RVVIQP                                                                     6

SEQ ID NO: 15          moltype = AA  length = 8
FEATURE                Location/Qualifiers
source                 1..8
                       mol_type = protein
                       organism = Gallus gallus
SEQUENCE: 15
SAAVGSIL                                                                   8

SEQ ID NO: 16          moltype = AA  length = 7
FEATURE                Location/Qualifiers
source                 1..7
                       mol_type = protein
                       organism = Gallus gallus
SEQUENCE: 16
IVVIGHV                                                                    7

SEQ ID NO: 17          moltype = AA  length = 9
```

-continued

```
FEATURE                 Location/Qualifiers
source                  1..9
                        mol_type = protein
                        organism = Gallus gallus
SEQUENCE: 17
TAVGSSTSA                                                   9

SEQ ID NO: 18           moltype = AA  length = 7
FEATURE                 Location/Qualifiers
source                  1..7
                        mol_type = protein
                        organism = Gallus gallus
SEQUENCE: 18
RVVIQPS                                                     7

SEQ ID NO: 19           moltype = AA  length = 7
FEATURE                 Location/Qualifiers
source                  1..7
                        mol_type = protein
                        organism = Gallus gallus
SEQUENCE: 19
SRVVIQP                                                     7

SEQ ID NO: 20           moltype = AA  length = 7
FEATURE                 Location/Qualifiers
source                  1..7
                        mol_type = protein
                        organism = Gallus gallus
SEQUENCE: 20
PQGEQLQ                                                     7

SEQ ID NO: 21           moltype = AA  length = 9
FEATURE                 Location/Qualifiers
source                  1..9
                        mol_type = protein
                        organism = Gallus gallus
SEQUENCE: 21
RAGAGPPSP                                                   9

SEQ ID NO: 22           moltype = AA  length = 7
FEATURE                 Location/Qualifiers
source                  1..7
                        mol_type = protein
                        organism = Gallus gallus
SEQUENCE: 22
DSRVVIQ                                                     7

SEQ ID NO: 23           moltype = AA  length = 8
FEATURE                 Location/Qualifiers
source                  1..8
                        mol_type = protein
                        organism = Gallus gallus
SEQUENCE: 23
PGPILSSF                                                    8

SEQ ID NO: 24           moltype = AA  length = 9
FEATURE                 Location/Qualifiers
source                  1..9
                        mol_type = protein
                        organism = Gallus gallus
SEQUENCE: 24
PISSGGFGI                                                   9

SEQ ID NO: 25           moltype = AA  length = 8
FEATURE                 Location/Qualifiers
source                  1..8
                        mol_type = protein
                        organism = Gallus gallus
SEQUENCE: 25
ISGLGSRF                                                    8

SEQ ID NO: 26           moltype = AA  length = 10
FEATURE                 Location/Qualifiers
source                  1..10
                        mol_type = protein
                        organism = Gallus gallus
SEQUENCE: 26
SGGFGISGLG                                                  10
```

-continued

```
SEQ ID NO: 27           moltype = AA  length = 7
FEATURE                 Location/Qualifiers
source                  1..7
                        mol_type = protein
                        organism = Gallus gallus
SEQUENCE: 27
SRFSGRR                                                             7

SEQ ID NO: 28           moltype = AA  length = 9
FEATURE                 Location/Qualifiers
source                  1..9
                        mol_type = protein
                        organism = Gallus gallus
SEQUENCE: 28
PGLALPVLP                                                           9

SEQ ID NO: 29           moltype = AA  length = 8
FEATURE                 Location/Qualifiers
source                  1..8
                        mol_type = protein
                        organism = Gallus gallus
SEQUENCE: 29
SRVVIQPS                                                            8

SEQ ID NO: 30           moltype = AA  length = 8
FEATURE                 Location/Qualifiers
source                  1..8
                        mol_type = protein
                        organism = Gallus gallus
SEQUENCE: 30
PILSSFPQ                                                            8

SEQ ID NO: 31           moltype = AA  length = 8
FEATURE                 Location/Qualifiers
source                  1..8
                        mol_type = protein
                        organism = Gallus gallus
SEQUENCE: 31
LGSGIFWI                                                            8

SEQ ID NO: 32           moltype = AA  length = 9
FEATURE                 Location/Qualifiers
source                  1..9
                        mol_type = protein
                        organism = Gallus gallus
SEQUENCE: 32
GISGLGSRF                                                           9

SEQ ID NO: 33           moltype = AA  length = 9
FEATURE                 Location/Qualifiers
source                  1..9
                        mol_type = protein
                        organism = Gallus gallus
SEQUENCE: 33
VVVTLPGPI                                                           9

SEQ ID NO: 34           moltype = AA  length = 8
FEATURE                 Location/Qualifiers
source                  1..8
                        mol_type = protein
                        organism = Gallus gallus
SEQUENCE: 34
CRLSLSQP                                                            8

SEQ ID NO: 35           moltype = AA  length = 11
FEATURE                 Location/Qualifiers
source                  1..11
                        mol_type = protein
                        organism = Gallus gallus
SEQUENCE: 35
SAAVGSSLSA G                                                        11

SEQ ID NO: 36           moltype = AA  length = 11
FEATURE                 Location/Qualifiers
source                  1..11
                        mol_type = protein
                        organism = Gallus gallus
SEQUENCE: 36
AVGSSTSAAV G                                                        11
```

```
SEQ ID NO: 37          moltype = AA  length = 9
FEATURE                Location/Qualifiers
source                 1..9
                       mol_type = protein
                       organism = Gallus gallus
SEQUENCE: 37
VVTLPGPIL                                                    9

SEQ ID NO: 38          moltype = AA  length = 9
FEATURE                Location/Qualifiers
source                 1..9
                       mol_type = protein
                       organism = Gallus gallus
SEQUENCE: 38
PGPILSSFP                                                    9

SEQ ID NO: 39          moltype = AA  length = 10
FEATURE                Location/Qualifiers
source                 1..10
                       mol_type = protein
                       organism = Gallus gallus
SEQUENCE: 39
SAAVGSILSE                                                   10

SEQ ID NO: 40          moltype = AA  length = 10
FEATURE                Location/Qualifiers
source                 1..10
                       mol_type = protein
                       organism = Gallus gallus
SEQUENCE: 40
VPISSGGFGI                                                   10

SEQ ID NO: 41          moltype = AA  length = 8
FEATURE                Location/Qualifiers
source                 1..8
                       mol_type = protein
                       organism = Gallus gallus
SEQUENCE: 41
QLAQRNTI                                                     8

SEQ ID NO: 42          moltype = AA  length = 9
FEATURE                Location/Qualifiers
source                 1..9
                       mol_type = protein
                       organism = Gallus gallus
SEQUENCE: 42
LSGLRSNLS                                                    9

SEQ ID NO: 43          moltype = AA  length = 10
FEATURE                Location/Qualifiers
source                 1..10
                       mol_type = protein
                       organism = Gallus gallus
SEQUENCE: 43
PSPVVVTLPG                                                   10

SEQ ID NO: 44          moltype = AA  length = 10
FEATURE                Location/Qualifiers
source                 1..10
                       mol_type = protein
                       organism = Gallus gallus
SEQUENCE: 44
PPPVVVTLPG                                                   10

SEQ ID NO: 45          moltype = AA  length = 10
FEATURE                Location/Qualifiers
source                 1..10
                       mol_type = protein
                       organism = Gallus gallus
SEQUENCE: 45
ISGLGSRFSG                                                   10

SEQ ID NO: 46          moltype = AA  length = 9
FEATURE                Location/Qualifiers
source                 1..9
                       mol_type = protein
                       organism = Gallus gallus
```

-continued

```
SEQUENCE: 46
LALRQSVEA                                                          9

SEQ ID NO: 47          moltype = AA  length = 10
FEATURE                Location/Qualifiers
source                 1..10
                       mol_type = protein
                       organism = Gallus gallus
SEQUENCE: 47
PLLGPPLLGI                                                         10

SEQ ID NO: 48          moltype = AA  length = 10
FEATURE                Location/Qualifiers
source                 1..10
                       mol_type = protein
                       organism = Gallus gallus
SEQUENCE: 48
VVTLPGPILS                                                         10

SEQ ID NO: 49          moltype = AA  length = 8
FEATURE                Location/Qualifiers
source                 1..8
                       mol_type = protein
                       organism = Gallus gallus
SEQUENCE: 49
VTLEDLRR                                                           8

SEQ ID NO: 50          moltype = AA  length = 9
FEATURE                Location/Qualifiers
source                 1..9
                       mol_type = protein
                       organism = Gallus gallus
SEQUENCE: 50
PILSSFPQN                                                          9

SEQ ID NO: 51          moltype = AA  length = 9
FEATURE                Location/Qualifiers
source                 1..9
                       mol_type = protein
                       organism = Gallus gallus
SEQUENCE: 51
PILSSFPQD                                                          9

SEQ ID NO: 52          moltype = AA  length = 11
FEATURE                Location/Qualifiers
source                 1..11
                       mol_type = protein
                       organism = Gallus gallus
SEQUENCE: 52
GTVGVSAGVT R                                                       11

SEQ ID NO: 53          moltype = AA  length = 9
FEATURE                Location/Qualifiers
source                 1..9
                       mol_type = protein
                       organism = Gallus gallus
SEQUENCE: 53
FGLSRVTLN                                                          9

SEQ ID NO: 54          moltype = AA  length = 12
FEATURE                Location/Qualifiers
source                 1..12
                       mol_type = protein
                       organism = Gallus gallus
SEQUENCE: 54
TAVGSSTSAA VG                                                      12

SEQ ID NO: 55          moltype = AA  length = 10
FEATURE                Location/Qualifiers
source                 1..10
                       mol_type = protein
                       organism = Gallus gallus
SEQUENCE: 55
VVVTLPGPIL                                                         10

SEQ ID NO: 56          moltype = AA  length = 10
FEATURE                Location/Qualifiers
```

-continued

```
source                  1..10
                        mol_type = protein
                        organism = Gallus gallus
SEQUENCE: 56
PPVVVTFPGP                                                          10

SEQ ID NO: 57           moltype = AA  length = 10
FEATURE                 Location/Qualifiers
source                  1..10
                        mol_type = protein
                        organism = Gallus gallus
SEQUENCE: 57
PPPVVVTFPG                                                          10

SEQ ID NO: 58           moltype = AA  length = 10
FEATURE                 Location/Qualifiers
source                  1..10
                        mol_type = protein
                        organism = Gallus gallus
SEQUENCE: 58
VVIQPSPVVV                                                          10

SEQ ID NO: 59           moltype = AA  length = 10
FEATURE                 Location/Qualifiers
source                  1..10
                        mol_type = protein
                        organism = Gallus gallus
SEQUENCE: 59
FGISGLGSRF                                                          10

SEQ ID NO: 60           moltype = AA  length = 10
FEATURE                 Location/Qualifiers
source                  1..10
                        mol_type = protein
                        organism = Gallus gallus
SEQUENCE: 60
PGPILSSFPQ                                                          10

SEQ ID NO: 61           moltype = AA  length = 10
FEATURE                 Location/Qualifiers
source                  1..10
                        mol_type = protein
                        organism = Gallus gallus
SEQUENCE: 61
FGWSGLGRGL                                                          10

SEQ ID NO: 62           moltype = AA  length = 9
FEATURE                 Location/Qualifiers
source                  1..9
                        mol_type = protein
                        organism = Gallus gallus
SEQUENCE: 62
LEAQLSELR                                                           9

SEQ ID NO: 63           moltype = AA  length = 9
FEATURE                 Location/Qualifiers
source                  1..9
                        mol_type = protein
                        organism = Gallus gallus
SEQUENCE: 63
IVGAWYTVR                                                           9

SEQ ID NO: 64           moltype = AA  length = 11
FEATURE                 Location/Qualifiers
source                  1..11
                        mol_type = protein
                        organism = Gallus gallus
SEQUENCE: 64
LLSPPGLPGL L                                                        11

SEQ ID NO: 65           moltype = AA  length = 11
FEATURE                 Location/Qualifiers
source                  1..11
                        mol_type = protein
                        organism = Gallus gallus
SEQUENCE: 65
VVVTLPGPIL S                                                        11

SEQ ID NO: 66           moltype = AA  length = 11
```

```
FEATURE                 Location/Qualifiers
source                  1..11
                        mol_type = protein
                        organism = Gallus gallus
SEQUENCE: 66
GFGISGLGSR F                                                  11

SEQ ID NO: 67           moltype = AA  length = 11
FEATURE                 Location/Qualifiers
source                  1..11
                        mol_type = protein
                        organism = Gallus gallus
SEQUENCE: 67
PVVVTLPGPI L                                                  11

SEQ ID NO: 68           moltype = AA  length = 11
FEATURE                 Location/Qualifiers
source                  1..11
                        mol_type = protein
                        organism = Gallus gallus
SEQUENCE: 68
VSQGEITVPS I                                                  11

SEQ ID NO: 69           moltype = AA  length = 11
FEATURE                 Location/Qualifiers
source                  1..11
                        mol_type = protein
                        organism = Gallus gallus
SEQUENCE: 69
SILSEEGVPI S                                                  11

SEQ ID NO: 70           moltype = AA  length = 11
FEATURE                 Location/Qualifiers
source                  1..11
                        mol_type = protein
                        organism = Gallus gallus
SEQUENCE: 70
PVVVTFPGPI L                                                  11

SEQ ID NO: 71           moltype = AA  length = 13
FEATURE                 Location/Qualifiers
source                  1..13
                        mol_type = protein
                        organism = Gallus gallus
SEQUENCE: 71
PISSGGFGIS GLG                                                13

SEQ ID NO: 72           moltype = AA  length = 13
FEATURE                 Location/Qualifiers
source                  1..13
                        mol_type = protein
                        organism = Gallus gallus
SEQUENCE: 72
VGSSTSAAVG SIL                                                13

SEQ ID NO: 73           moltype = AA  length = 11
FEATURE                 Location/Qualifiers
source                  1..11
                        mol_type = protein
                        organism = Gallus gallus
SEQUENCE: 73
GFLSSAVSLN R                                                  11

SEQ ID NO: 74           moltype = AA  length = 12
FEATURE                 Location/Qualifiers
source                  1..12
                        mol_type = protein
                        organism = Gallus gallus
SEQUENCE: 74
GGFGISGLGS RF                                                 12

SEQ ID NO: 75           moltype = AA  length = 11
FEATURE                 Location/Qualifiers
source                  1..11
                        mol_type = protein
                        organism = Gallus gallus
SEQUENCE: 75
PGPILSSFPQ N                                                  11
```

```
SEQ ID NO: 76           moltype = AA  length = 11
FEATURE                 Location/Qualifiers
source                  1..11
                        mol_type = protein
                        organism = Gallus gallus
SEQUENCE: 76
PGPILSSFPQ D                                                          11

SEQ ID NO: 77           moltype = AA  length = 12
FEATURE                 Location/Qualifiers
source                  1..12
                        mol_type = protein
                        organism = Gallus gallus
SEQUENCE: 77
GGFGWSGLGR GL                                                         12

SEQ ID NO: 78           moltype = AA  length = 12
FEATURE                 Location/Qualifiers
source                  1..12
                        mol_type = protein
                        organism = Gallus gallus
SEQUENCE: 78
PSPVVVTLPG PI                                                         12

SEQ ID NO: 79           moltype = AA  length = 12
FEATURE                 Location/Qualifiers
source                  1..12
                        mol_type = protein
                        organism = Gallus gallus
SEQUENCE: 79
VVVTLPGPIL SS                                                         12

SEQ ID NO: 80           moltype = AA  length = 12
FEATURE                 Location/Qualifiers
source                  1..12
                        mol_type = protein
                        organism = Gallus gallus
SEQUENCE: 80
PVVVTLPGPI LS                                                         12

SEQ ID NO: 81           moltype = AA  length = 12
FEATURE                 Location/Qualifiers
source                  1..12
                        mol_type = protein
                        organism = Gallus gallus
SEQUENCE: 81
SPVVVTLPGP IL                                                         12

SEQ ID NO: 82           moltype = AA  length = 11
FEATURE                 Location/Qualifiers
source                  1..11
                        mol_type = protein
                        organism = Gallus gallus
SEQUENCE: 82
RVVIQPSPVV V                                                          11

SEQ ID NO: 83           moltype = AA  length = 11
FEATURE                 Location/Qualifiers
source                  1..11
                        mol_type = protein
                        organism = Gallus gallus
SEQUENCE: 83
QALTEVYAKA N                                                          11

SEQ ID NO: 84           moltype = AA  length = 10
FEATURE                 Location/Qualifiers
source                  1..10
                        mol_type = protein
                        organism = Gallus gallus
SEQUENCE: 84
IETLTQFLGW                                                            10

SEQ ID NO: 85           moltype = AA  length = 13
FEATURE                 Location/Qualifiers
source                  1..13
                        mol_type = protein
                        organism = Gallus gallus
SEQUENCE: 85
GFGSRSLVGL GGT                                                        13
```

```
SEQ ID NO: 86           moltype = AA  length = 14
FEATURE                 Location/Qualifiers
source                  1..14
                        mol_type = protein
                        organism = Gallus gallus
SEQUENCE: 86
AVGSSTSAAV GSIL                                                          14

SEQ ID NO: 87           moltype = AA  length = 12
FEATURE                 Location/Qualifiers
source                  1..12
                        mol_type = protein
                        organism = Gallus gallus
SEQUENCE: 87
PVVVTFPGPI LS                                                            12

SEQ ID NO: 88           moltype = AA  length = 14
FEATURE                 Location/Qualifiers
source                  1..14
                        mol_type = protein
                        organism = Gallus gallus
SEQUENCE: 88
VGSSTSAAVG SILS                                                          14

SEQ ID NO: 89           moltype = AA  length = 13
FEATURE                 Location/Qualifiers
source                  1..13
                        mol_type = protein
                        organism = Gallus gallus
SEQUENCE: 89
GFGISGLGSR FSG                                                           13

SEQ ID NO: 90           moltype = AA  length = 13
FEATURE                 Location/Qualifiers
source                  1..13
                        mol_type = protein
                        organism = Gallus gallus
SEQUENCE: 90
SGGFGISGLG SRF                                                           13

SEQ ID NO: 91           moltype = AA  length = 14
FEATURE                 Location/Qualifiers
source                  1..14
                        mol_type = protein
                        organism = Gallus gallus
SEQUENCE: 91
VPISSGGFGI SGLG                                                          14

SEQ ID NO: 92           moltype = AA  length = 12
FEATURE                 Location/Qualifiers
source                  1..12
                        mol_type = protein
                        organism = Gallus gallus
SEQUENCE: 92
VVIQPSPVVV TL                                                            12

SEQ ID NO: 93           moltype = AA  length = 13
FEATURE                 Location/Qualifiers
source                  1..13
                        mol_type = protein
                        organism = Gallus gallus
SEQUENCE: 93
SILSEEGVPI SSG                                                           13

SEQ ID NO: 94           moltype = AA  length = 13
FEATURE                 Location/Qualifiers
source                  1..13
                        mol_type = protein
                        organism = Gallus gallus
SEQUENCE: 94
VMGCKAAGAS RII                                                           13

SEQ ID NO: 95           moltype = AA  length = 13
FEATURE                 Location/Qualifiers
source                  1..13
                        mol_type = protein
                        organism = Gallus gallus
```

-continued

```
SEQUENCE: 95
SPVVVTLPGP ILS                                                      13

SEQ ID NO: 96           moltype = AA  length = 12
FEATURE                 Location/Qualifiers
source                  1..12
                        mol_type = protein
                        organism = Gallus gallus
SEQUENCE: 96
SRVVIQPSPV VV                                                       12

SEQ ID NO: 97           moltype = AA  length = 13
FEATURE                 Location/Qualifiers
source                  1..13
                        mol_type = protein
                        organism = Gallus gallus
SEQUENCE: 97
PSPVVVTLPG PIL                                                      13

SEQ ID NO: 98           moltype = AA  length = 12
FEATURE                 Location/Qualifiers
source                  1..12
                        mol_type = protein
                        organism = Gallus gallus
SEQUENCE: 98
RVVIQPSPVV VT                                                       12

SEQ ID NO: 99           moltype = AA  length = 13
FEATURE                 Location/Qualifiers
source                  1..13
                        mol_type = protein
                        organism = Gallus gallus
SEQUENCE: 99
PPPVVVTLPG PIL                                                      13

SEQ ID NO: 100          moltype = AA  length = 15
FEATURE                 Location/Qualifiers
source                  1..15
                        mol_type = protein
                        organism = Gallus gallus
SEQUENCE: 100
GVPISSGGFG ISGLG                                                    15

SEQ ID NO: 101          moltype = AA  length = 13
FEATURE                 Location/Qualifiers
source                  1..13
                        mol_type = protein
                        organism = Gallus gallus
SEQUENCE: 101
VIQPSPVVVT LPG                                                      13

SEQ ID NO: 102          moltype = AA  length = 15
FEATURE                 Location/Qualifiers
source                  1..15
                        mol_type = protein
                        organism = Gallus gallus
SEQUENCE: 102
AVGSSTSAAV GSILS                                                    15

SEQ ID NO: 103          moltype = AA  length = 15
FEATURE                 Location/Qualifiers
source                  1..15
                        mol_type = protein
                        organism = Gallus gallus
SEQUENCE: 103
TAVGSSTSAA VGSIL                                                    15

SEQ ID NO: 104          moltype = AA  length = 14
FEATURE                 Location/Qualifiers
source                  1..14
                        mol_type = protein
                        organism = Gallus gallus
SEQUENCE: 104
SGGFGISGLG SRFS                                                     14

SEQ ID NO: 105          moltype = AA  length = 13
FEATURE                 Location/Qualifiers
```

-continued

```
source              1..13
                    mol_type = protein
                    organism = Gallus gallus
SEQUENCE: 105
VVVTLPGPIL SSF                                                      13

SEQ ID NO: 106      moltype = AA  length = 13
FEATURE             Location/Qualifiers
source              1..13
                    mol_type = protein
                    organism = Gallus gallus
SEQUENCE: 106
PPPVVVTFPG PIL                                                      13

SEQ ID NO: 107      moltype = AA  length = 14
FEATURE             Location/Qualifiers
source              1..14
                    mol_type = protein
                    organism = Gallus gallus
SEQUENCE: 107
GLGGFGWSGL GRGL                                                     14

SEQ ID NO: 108      moltype = AA  length = 13
FEATURE             Location/Qualifiers
source              1..13
                    mol_type = protein
                    organism = Gallus gallus
SEQUENCE: 108
VTLPGPILSS FPQ                                                      13

SEQ ID NO: 109      moltype = AA  length = 14
FEATURE             Location/Qualifiers
source              1..14
                    mol_type = protein
                    organism = Gallus gallus
SEQUENCE: 109
AVGSILSEEG VPIS                                                     14

SEQ ID NO: 110      moltype = AA  length = 14
FEATURE             Location/Qualifiers
source              1..14
                    mol_type = protein
                    organism = Gallus gallus
SEQUENCE: 110
SLGLGGFGWS GLGR                                                     14

SEQ ID NO: 111      moltype = AA  length = 14
FEATURE             Location/Qualifiers
source              1..14
                    mol_type = protein
                    organism = Gallus gallus
SEQUENCE: 111
PSPVVVTLPG PILS                                                     14

SEQ ID NO: 112      moltype = AA  length = 13
FEATURE             Location/Qualifiers
source              1..13
                    mol_type = protein
                    organism = Gallus gallus
SEQUENCE: 112
SRVVIQPSPV VVT                                                      13

SEQ ID NO: 113      moltype = AA  length = 15
FEATURE             Location/Qualifiers
source              1..15
                    mol_type = protein
                    organism = Gallus gallus
SEQUENCE: 113
SGGFGISGLG SRFSG                                                    15

SEQ ID NO: 114      moltype = AA  length = 14
FEATURE             Location/Qualifiers
source              1..14
                    mol_type = protein
                    organism = Gallus gallus
SEQUENCE: 114
PPPVVVTLPG PILS                                                     14

SEQ ID NO: 115      moltype = AA  length = 14
```

```
FEATURE                Location/Qualifiers
source                 1..14
                       mol_type = protein
                       organism = Gallus gallus
SEQUENCE: 115
VAIQPPPVVV TLPG                                              14

SEQ ID NO: 116         moltype = AA  length = 15
FEATURE                Location/Qualifiers
source                 1..15
                       mol_type = protein
                       organism = Gallus gallus
SEQUENCE: 116
PISSGGFGIS GLGSR                                             15

SEQ ID NO: 117         moltype = AA  length = 13
FEATURE                Location/Qualifiers
source                 1..13
                       mol_type = protein
                       organism = Gallus gallus
SEQUENCE: 117
PIVDVAEALL HVK                                               13

SEQ ID NO: 118         moltype = AA  length = 14
FEATURE                Location/Qualifiers
source                 1..14
                       mol_type = protein
                       organism = Gallus gallus
SEQUENCE: 118
VVIQPSPVVV TLPG                                              14

SEQ ID NO: 119         moltype = AA  length = 13
FEATURE                Location/Qualifiers
source                 1..13
                       mol_type = protein
                       organism = Gallus gallus
SEQUENCE: 119
RVVIQPSPVV VTL                                               13

SEQ ID NO: 120         moltype = AA  length = 16
FEATURE                Location/Qualifiers
source                 1..16
                       mol_type = protein
                       organism = Gallus gallus
SEQUENCE: 120
TAVGSSTSAA VGSILS                                            16

SEQ ID NO: 121         moltype = AA  length = 14
FEATURE                Location/Qualifiers
source                 1..14
                       mol_type = protein
                       organism = Gallus gallus
SEQUENCE: 121
PPPVVVTFPG PILS                                              14

SEQ ID NO: 122         moltype = AA  length = 15
FEATURE                Location/Qualifiers
source                 1..15
                       mol_type = protein
                       organism = Gallus gallus
SEQUENCE: 122
SLGLGGFGWS GLGRG                                             15

SEQ ID NO: 123         moltype = AA  length = 14
FEATURE                Location/Qualifiers
source                 1..14
                       mol_type = protein
                       organism = Gallus gallus
SEQUENCE: 123
VVVTLPGPIL SSFP                                              14

SEQ ID NO: 124         moltype = AA  length = 14
FEATURE                Location/Qualifiers
source                 1..14
                       mol_type = protein
                       organism = Gallus gallus
SEQUENCE: 124
PVVVTLPGPI LSSF                                              14
```

```
SEQ ID NO: 125          moltype = AA  length = 15
FEATURE                 Location/Qualifiers
source                  1..15
                        mol_type = protein
                        organism = Gallus gallus
SEQUENCE: 125
AAVGSILSEE GVPIS                                                   15

SEQ ID NO: 126          moltype = AA  length = 15
FEATURE                 Location/Qualifiers
source                  1..15
                        mol_type = protein
                        organism = Gallus gallus
SEQUENCE: 126
SAAVGSILSE EGVPI                                                   15

SEQ ID NO: 127          moltype = AA  length = 16
FEATURE                 Location/Qualifiers
source                  1..16
                        mol_type = protein
                        organism = Gallus gallus
SEQUENCE: 127
EGVPISSGGF GISGLG                                                  16

SEQ ID NO: 128          moltype = AA  length = 14
FEATURE                 Location/Qualifiers
source                  1..14
                        mol_type = protein
                        organism = Gallus gallus
SEQUENCE: 128
VVTLPGPILS SFPQ                                                    14

SEQ ID NO: 129          moltype = AA  length = 15
FEATURE                 Location/Qualifiers
source                  1..15
                        mol_type = protein
                        organism = Gallus gallus
SEQUENCE: 129
PSPVVVTLPG PILSS                                                   15

SEQ ID NO: 130          moltype = AA  length = 16
FEATURE                 Location/Qualifiers
source                  1..16
                        mol_type = protein
                        organism = Gallus gallus
SEQUENCE: 130
GKDGPKGVRG DAGPPG                                                  16

SEQ ID NO: 131          moltype = AA  length = 15
FEATURE                 Location/Qualifiers
source                  1..15
                        mol_type = protein
                        organism = Gallus gallus
SEQUENCE: 131
SVAIQPPPVV VTLPG                                                   15

SEQ ID NO: 132          moltype = AA  length = 14
FEATURE                 Location/Qualifiers
source                  1..14
                        mol_type = protein
                        organism = Gallus gallus
SEQUENCE: 132
SRVVIQPSPV VVTL                                                    14

SEQ ID NO: 133          moltype = AA  length = 14
FEATURE                 Location/Qualifiers
source                  1..14
                        mol_type = protein
                        organism = Gallus gallus
SEQUENCE: 133
LHTEAAATVP DRSE                                                    14

SEQ ID NO: 134          moltype = AA  length = 15
FEATURE                 Location/Qualifiers
source                  1..15
                        mol_type = protein
                        organism = Gallus gallus
SEQUENCE: 134
VVIQPSPVVV TLPGP                                                   15
```

```
SEQ ID NO: 135          moltype = AA  length = 14
FEATURE                 Location/Qualifiers
source                  1..14
                        mol_type = protein
                        organism = Gallus gallus
SEQUENCE: 135
RVVIQPSPVV VTLP                                               14

SEQ ID NO: 136          moltype = AA  length = 16
FEATURE                 Location/Qualifiers
source                  1..16
                        mol_type = protein
                        organism = Gallus gallus
SEQUENCE: 136
SAAVGSILSE EGVPIS                                             16

SEQ ID NO: 137          moltype = AA  length = 15
FEATURE                 Location/Qualifiers
source                  1..15
                        mol_type = protein
                        organism = Gallus gallus
SEQUENCE: 137
PVVVTLPGPI LSSFP                                              15

SEQ ID NO: 138          moltype = AA  length = 15
FEATURE                 Location/Qualifiers
source                  1..15
                        mol_type = protein
                        organism = Gallus gallus
SEQUENCE: 138
IQPSPVVVTL PGPIL                                              15

SEQ ID NO: 139          moltype = AA  length = 17
FEATURE                 Location/Qualifiers
source                  1..17
                        mol_type = protein
                        organism = Gallus gallus
SEQUENCE: 139
SVPIGAGGSL GLGGFGW                                            17

SEQ ID NO: 140          moltype = AA  length = 16
FEATURE                 Location/Qualifiers
source                  1..16
                        mol_type = protein
                        organism = Gallus gallus
SEQUENCE: 140
SLGLGGFGWS GLGRGL                                             16

SEQ ID NO: 141          moltype = AA  length = 17
FEATURE                 Location/Qualifiers
source                  1..17
                        mol_type = protein
                        organism = Gallus gallus
SEQUENCE: 141
FGGGFGGGDG ILPAGEK                                            17

SEQ ID NO: 142          moltype = AA  length = 17
FEATURE                 Location/Qualifiers
source                  1..17
                        mol_type = protein
                        organism = Gallus gallus
SEQUENCE: 142
TAVGSSTSAA VGSILSE                                            17

SEQ ID NO: 143          moltype = AA  length = 16
FEATURE                 Location/Qualifiers
source                  1..16
                        mol_type = protein
                        organism = Gallus gallus
SEQUENCE: 143
PISSGGFGIS GLGSRF                                             16

SEQ ID NO: 144          moltype = AA  length = 19
FEATURE                 Location/Qualifiers
source                  1..19
                        mol_type = protein
                        organism = Gallus gallus
```

```
SEQUENCE: 144
SAAVGSSLSA GSVPIGAGG                                          19

SEQ ID NO: 145         moltype = AA  length = 17
FEATURE                Location/Qualifiers
source                 1..17
                       mol_type = protein
                       organism = Gallus gallus
SEQUENCE: 145
GVPISSGGFG ISGLGSR                                            17

SEQ ID NO: 146         moltype = AA  length = 15
FEATURE                Location/Qualifiers
source                 1..15
                       mol_type = protein
                       organism = Gallus gallus
SEQUENCE: 146
VVVTLPGPIL SSFPQ                                              15

SEQ ID NO: 147         moltype = AA  length = 15
FEATURE                Location/Qualifiers
source                 1..15
                       mol_type = protein
                       organism = Gallus gallus
SEQUENCE: 147
RVVIQPSPVV VTLPG                                              15

SEQ ID NO: 148         moltype = AA  length = 15
FEATURE                Location/Qualifiers
source                 1..15
                       mol_type = protein
                       organism = Gallus gallus
SEQUENCE: 148
SRVVIQPSPV VVTLP                                              15

SEQ ID NO: 149         moltype = AA  length = 16
FEATURE                Location/Qualifiers
source                 1..16
                       mol_type = protein
                       organism = Gallus gallus
SEQUENCE: 149
PSPVVVTLPG PILSSF                                             16

SEQ ID NO: 150         moltype = AA  length = 16
FEATURE                Location/Qualifiers
source                 1..16
                       mol_type = protein
                       organism = Gallus gallus
SEQUENCE: 150
AIQPPPVVVT LPGPIL                                             16

SEQ ID NO: 151         moltype = AA  length = 16
FEATURE                Location/Qualifiers
source                 1..16
                       mol_type = protein
                       organism = Gallus gallus
SEQUENCE: 151
IQPSPVVVTL PGPILS                                             16

SEQ ID NO: 152         moltype = AA  length = 16
FEATURE                Location/Qualifiers
source                 1..16
                       mol_type = protein
                       organism = Gallus gallus
SEQUENCE: 152
VIQPSPVVVT LPGPIL                                             16

SEQ ID NO: 153         moltype = AA  length = 17
FEATURE                Location/Qualifiers
source                 1..17
                       mol_type = protein
                       organism = Gallus gallus
SEQUENCE: 153
VPISSGGFGI SGLGSRF                                            17

SEQ ID NO: 154         moltype = AA  length = 16
FEATURE                Location/Qualifiers
```

-continued

```
source                  1..16
                        mol_type = protein
                        organism = Gallus gallus
SEQUENCE: 154
SRVVIQPSPV VVTLPG                                                     16

SEQ ID NO: 155          moltype = AA  length = 17
FEATURE                 Location/Qualifiers
source                  1..17
                        mol_type = protein
                        organism = Gallus gallus
SEQUENCE: 155
SILSEEGVPI SSGGFGI                                                    17

SEQ ID NO: 156          moltype = AA  length = 16
FEATURE                 Location/Qualifiers
source                  1..16
                        mol_type = protein
                        organism = Gallus gallus
SEQUENCE: 156
PVVVTLPGPI LSSFPQ                                                     16

SEQ ID NO: 157          moltype = AA  length = 16
FEATURE                 Location/Qualifiers
source                  1..16
                        mol_type = protein
                        organism = Gallus gallus
SEQUENCE: 157
RVVIQPSPVV VTLPGP                                                     16

SEQ ID NO: 158          moltype = AA  length = 18
FEATURE                 Location/Qualifiers
source                  1..18
                        mol_type = protein
                        organism = Gallus gallus
SEQUENCE: 158
SAAVGSILSE EGVPISSG                                                   18

SEQ ID NO: 159          moltype = AA  length = 16
FEATURE                 Location/Qualifiers
source                  1..16
                        mol_type = protein
                        organism = Gallus gallus
SEQUENCE: 159
VVVTLPGPIL SSFPQN                                                     16

SEQ ID NO: 160          moltype = AA  length = 18
FEATURE                 Location/Qualifiers
source                  1..18
                        mol_type = protein
                        organism = Gallus gallus
SEQUENCE: 160
GVPISSGGFG ISGLGSRF                                                   18

SEQ ID NO: 161          moltype = AA  length = 17
FEATURE                 Location/Qualifiers
source                  1..17
                        mol_type = protein
                        organism = Gallus gallus
SEQUENCE: 161
PSPVVVTLPG PILSSFP                                                    17

SEQ ID NO: 162          moltype = AA  length = 17
FEATURE                 Location/Qualifiers
source                  1..17
                        mol_type = protein
                        organism = Gallus gallus
SEQUENCE: 162
VAIQPPPVVV TLPGPIL                                                    17

SEQ ID NO: 163          moltype = AA  length = 17
FEATURE                 Location/Qualifiers
source                  1..17
                        mol_type = protein
                        organism = Gallus gallus
SEQUENCE: 163
VIQPSPVVVT LPGPILS                                                    17

SEQ ID NO: 164          moltype = AA  length = 17
```

```
FEATURE                Location/Qualifiers
source                 1..17
                       mol_type = protein
                       organism = Gallus gallus
SEQUENCE: 164
VVIQPSPVVV TLPGPIL                                               17

SEQ ID NO: 165         moltype = AA  length = 17
FEATURE                Location/Qualifiers
source                 1..17
                       mol_type = protein
                       organism = Gallus gallus
SEQUENCE: 165
SPVVVTLPGP ILSSFPQ                                               17

SEQ ID NO: 166         moltype = AA  length = 15
FEATURE                Location/Qualifiers
source                 1..15
                       mol_type = protein
                       organism = Gallus gallus
SEQUENCE: 166
VILSNTKTQY SIKIH                                                 15

SEQ ID NO: 167         moltype = AA  length = 17
FEATURE                Location/Qualifiers
source                 1..17
                       mol_type = protein
                       organism = Gallus gallus
SEQUENCE: 167
SRVVIQPSPV VVTLPGP                                               17

SEQ ID NO: 168         moltype = AA  length = 17
FEATURE                Location/Qualifiers
source                 1..17
                       mol_type = protein
                       organism = Gallus gallus
SEQUENCE: 168
DSRVVIQPSP VVVTLPG                                               17

SEQ ID NO: 169         moltype = AA  length = 17
FEATURE                Location/Qualifiers
source                 1..17
                       mol_type = protein
                       organism = Gallus gallus
SEQUENCE: 169
PVVVTLPGPI LSSFPQN                                               17

SEQ ID NO: 170         moltype = AA  length = 17
FEATURE                Location/Qualifiers
source                 1..17
                       mol_type = protein
                       organism = Gallus gallus
SEQUENCE: 170
RVVIQPSPVV VTLPGPI                                               17

SEQ ID NO: 171         moltype = AA  length = 19
FEATURE                Location/Qualifiers
source                 1..19
                       mol_type = protein
                       organism = Gallus gallus
SEQUENCE: 171
GVPISSGGFG ISGLGSRFS                                             19

SEQ ID NO: 172         moltype = AA  length = 18
FEATURE                Location/Qualifiers
source                 1..18
                       mol_type = protein
                       organism = Gallus gallus
SEQUENCE: 172
SVAIQPPPVV VTLPGPIL                                              18

SEQ ID NO: 173         moltype = AA  length = 18
FEATURE                Location/Qualifiers
source                 1..18
                       mol_type = protein
                       organism = Gallus gallus
SEQUENCE: 173
VAIQPPPVVV TLPGPILS                                              18
```

```
SEQ ID NO: 174          moltype = AA  length = 18
FEATURE                 Location/Qualifiers
source                  1..18
                        mol_type = protein
                        organism = Gallus gallus
SEQUENCE: 174
VVIQPSPVVV TLPGPILS                                                18

SEQ ID NO: 175          moltype = AA  length = 18
FEATURE                 Location/Qualifiers
source                  1..18
                        mol_type = protein
                        organism = Gallus gallus
SEQUENCE: 175
PSPVVVTLPG PILSSFPQ                                                18

SEQ ID NO: 176          moltype = AA  length = 20
FEATURE                 Location/Qualifiers
source                  1..20
                        mol_type = protein
                        organism = Gallus gallus
SEQUENCE: 176
GVPISSGGFG ISGLGSRFSG                                              20

SEQ ID NO: 177          moltype = AA  length = 18
FEATURE                 Location/Qualifiers
source                  1..18
                        mol_type = protein
                        organism = Gallus gallus
SEQUENCE: 177
AVPLVRPVTM VPSIPGIP                                                18

SEQ ID NO: 178          moltype = AA  length = 18
FEATURE                 Location/Qualifiers
source                  1..18
                        mol_type = protein
                        organism = Gallus gallus
SEQUENCE: 178
PPPVVVTLPG PILSSFPQ                                                18

SEQ ID NO: 179          moltype = AA  length = 18
FEATURE                 Location/Qualifiers
source                  1..18
                        mol_type = protein
                        organism = Gallus gallus
SEQUENCE: 179
SPVVVTLPGP ILSSFPQN                                                18

SEQ ID NO: 180          moltype = AA  length = 18
FEATURE                 Location/Qualifiers
source                  1..18
                        mol_type = protein
                        organism = Gallus gallus
SEQUENCE: 180
LPGPGLQLLH GTTTLAFK                                                18

SEQ ID NO: 181          moltype = AA  length = 18
FEATURE                 Location/Qualifiers
source                  1..18
                        mol_type = protein
                        organism = Gallus gallus
SEQUENCE: 181
PPPVVVTFPG PILSSFPQ                                                18

SEQ ID NO: 182          moltype = AA  length = 19
FEATURE                 Location/Qualifiers
source                  1..19
                        mol_type = protein
                        organism = Gallus gallus
SEQUENCE: 182
SVAIQPPPVV VTLPGPILS                                               19

SEQ ID NO: 183          moltype = AA  length = 19
FEATURE                 Location/Qualifiers
source                  1..19
                        mol_type = protein
                        organism = Gallus gallus
SEQUENCE: 183
SSVAIQPPPV VVTLPGPIL                                               19
```

```
SEQ ID NO: 184         moltype = AA  length = 18
FEATURE                Location/Qualifiers
source                 1..18
                       mol_type = protein
                       organism = Gallus gallus
SEQUENCE: 184
RVVIQPSPVV VTLPGPIL                                               18

SEQ ID NO: 185         moltype = AA  length = 19
FEATURE                Location/Qualifiers
source                 1..19
                       mol_type = protein
                       organism = Gallus gallus
SEQUENCE: 185
PSPVVVTLPG PILSSFPQN                                              19

SEQ ID NO: 186         moltype = AA  length = 21
FEATURE                Location/Qualifiers
source                 1..21
                       mol_type = protein
                       organism = Gallus gallus
SEQUENCE: 186
SILSEEGVPI SSGGFGISGL G                                           21

SEQ ID NO: 187         moltype = AA  length = 19
FEATURE                Location/Qualifiers
source                 1..19
                       mol_type = protein
                       organism = Gallus gallus
SEQUENCE: 187
SRVVIQPSPV VVTLPGPIL                                              19

SEQ ID NO: 188         moltype = AA  length = 19
FEATURE                Location/Qualifiers
source                 1..19
                       mol_type = protein
                       organism = Gallus gallus
SEQUENCE: 188
RVVIQPSPVV VTLPGPILS                                              19

SEQ ID NO: 189         moltype = AA  length = 22
FEATURE                Location/Qualifiers
source                 1..22
                       mol_type = protein
                       organism = Gallus gallus
SEQUENCE: 189
SVPIGAGGSL GLGGFGWSGL GR                                          22

SEQ ID NO: 190         moltype = AA  length = 22
FEATURE                Location/Qualifiers
source                 1..22
                       mol_type = protein
                       organism = Gallus gallus
SEQUENCE: 190
TAVGSSTSAA VGSILSEEGV PI                                          22

SEQ ID NO: 191         moltype = AA  length = 22
FEATURE                Location/Qualifiers
source                 1..22
                       mol_type = protein
                       organism = Gallus gallus
SEQUENCE: 191
SAAVGSILSE EGVPISSGGF GI                                          22

SEQ ID NO: 192         moltype = AA  length = 21
FEATURE                Location/Qualifiers
source                 1..21
                       mol_type = protein
                       organism = Gallus gallus
SEQUENCE: 192
SEEGVPISSG GFGISGLGSR F                                           21

SEQ ID NO: 193         moltype = AA  length = 20
FEATURE                Location/Qualifiers
source                 1..20
                       mol_type = protein
                       organism = Gallus gallus
```

```
SEQUENCE: 193
SRVVIQPSPV VVTLPGPILS                                   20

SEQ ID NO: 194         moltype = AA  length = 23
FEATURE                Location/Qualifiers
source                 1..23
                       mol_type = protein
                       organism = Gallus gallus
SEQUENCE: 194
SVPIGAGGSL GLGGFGWSGL GRG                               23

SEQ ID NO: 195         moltype = AA  length = 20
FEATURE                Location/Qualifiers
source                 1..20
                       mol_type = protein
                       organism = Gallus gallus
SEQUENCE: 195
DSRVVIQPSP VVVTLPGPIL                                   20

SEQ ID NO: 196         moltype = AA  length = 23
FEATURE                Location/Qualifiers
source                 1..23
                       mol_type = protein
                       organism = Gallus gallus
SEQUENCE: 196
TAVGSSTSAA VGSILSEEGV PIS                               23

SEQ ID NO: 197         moltype = AA  length = 22
FEATURE                Location/Qualifiers
source                 1..22
                       mol_type = protein
                       organism = Gallus gallus
SEQUENCE: 197
LRGDVGPVGR TGEQGIAGPP GF                                22

SEQ ID NO: 198         moltype = AA  length = 21
FEATURE                Location/Qualifiers
source                 1..21
                       mol_type = protein
                       organism = Gallus gallus
SEQUENCE: 198
SRVVIQPSPV VVTLPGPILS S                                 21

SEQ ID NO: 199         moltype = AA  length = 21
FEATURE                Location/Qualifiers
source                 1..21
                       mol_type = protein
                       organism = Gallus gallus
SEQUENCE: 199
VVIQPSPVVV TLPGPILSSF P                                 21

SEQ ID NO: 200         moltype = AA  length = 22
FEATURE                Location/Qualifiers
source                 1..22
                       mol_type = protein
                       organism = Gallus gallus
SEQUENCE: 200
GVPISSGGFG ISGLGSRFSG RR                                22

SEQ ID NO: 201         moltype = AA  length = 24
FEATURE                Location/Qualifiers
source                 1..24
                       mol_type = protein
                       organism = Gallus gallus
SEQUENCE: 201
SVPIGAGGSL GLGGFGWSGL GRGL                              24

SEQ ID NO: 202         moltype = AA  length = 21
FEATURE                Location/Qualifiers
source                 1..21
                       mol_type = protein
                       organism = Gallus gallus
SEQUENCE: 202
DSRVVIQPSP VVVTLPGPIL S                                 21

SEQ ID NO: 203         moltype = AA  length = 21
FEATURE                Location/Qualifiers
```

```
source                1..21
                      mol_type = protein
                      organism = Gallus gallus
SEQUENCE: 203
VIQPSPVVVT LPGPILSSFP Q                                       21

SEQ ID NO: 204        moltype = AA  length = 24
FEATURE               Location/Qualifiers
source                1..24
                      mol_type = protein
                      organism = Gallus gallus
SEQUENCE: 204
AVGSILSEEG VPISSGGFGI SGLG                                    24

SEQ ID NO: 205        moltype = AA  length = 21
FEATURE               Location/Qualifiers
source                1..21
                      mol_type = protein
                      organism = Gallus gallus
SEQUENCE: 205
RVVIQPSPVV VTLPGPILSS F                                       21

SEQ ID NO: 206        moltype = AA  length = 23
FEATURE               Location/Qualifiers
source                1..23
                      mol_type = protein
                      organism = Gallus gallus
SEQUENCE: 206
SILSEEGVPI SSGGFGISGL GSR                                     23

SEQ ID NO: 207        moltype = AA  length = 21
FEATURE               Location/Qualifiers
source                1..21
                      mol_type = protein
                      organism = Gallus gallus
SEQUENCE: 207
IPSSVPESSF KIKGNSSSFH I                                       21

SEQ ID NO: 208        moltype = AA  length = 22
FEATURE               Location/Qualifiers
source                1..22
                      mol_type = protein
                      organism = Gallus gallus
SEQUENCE: 208
VAIQPPPVVV TLPGPILSSF PQ                                      22

SEQ ID NO: 209        moltype = AA  length = 25
FEATURE               Location/Qualifiers
source                1..25
                      mol_type = protein
                      organism = Gallus gallus
SEQUENCE: 209
TAVGSSTSAA VGSILSEEGV PISSG                                   25

SEQ ID NO: 210        moltype = AA  length = 22
FEATURE               Location/Qualifiers
source                1..22
                      mol_type = protein
                      organism = Gallus gallus
SEQUENCE: 210
VVIQPSPVVV TLPGPILSSF PQ                                      22

SEQ ID NO: 211        moltype = AA  length = 23
FEATURE               Location/Qualifiers
source                1..23
                      mol_type = protein
                      organism = Gallus gallus
SEQUENCE: 211
PSPVVVTLPG PILSSFPQNT AVG                                     23

SEQ ID NO: 212        moltype = AA  length = 20
FEATURE               Location/Qualifiers
source                1..20
                      mol_type = protein
                      organism = Gallus gallus
SEQUENCE: 212
KENFEVLCKD GTRKPVTDAE                                         20

SEQ ID NO: 213        moltype = AA  length = 21
```

```
FEATURE                Location/Qualifiers
source                 1..21
                       mol_type = protein
                       organism = Gallus gallus
SEQUENCE: 213
SIQACKLAQS HGWGVMVSHR S                                                    21

SEQ ID NO: 214         moltype = AA  length = 22
FEATURE                Location/Qualifiers
source                 1..22
                       mol_type = protein
                       organism = Gallus gallus
SEQUENCE: 214
SRVVIQPSPV VVTLPGPILS SF                                                   22

SEQ ID NO: 215         moltype = AA  length = 22
FEATURE                Location/Qualifiers
source                 1..22
                       mol_type = protein
                       organism = Gallus gallus
SEQUENCE: 215
RVVIQPSPVV VTLPGPILSS FP                                                   22

SEQ ID NO: 216         moltype = AA  length = 23
FEATURE                Location/Qualifiers
source                 1..23
                       mol_type = protein
                       organism = Gallus gallus
SEQUENCE: 216
EQPPLCVASV SVKEPASETP AVP                                                  23

SEQ ID NO: 217         moltype = AA  length = 23
FEATURE                Location/Qualifiers
source                 1..23
                       mol_type = protein
                       organism = Gallus gallus
SEQUENCE: 217
SVAIQPPPVV VTLPGPILSS FPQ                                                  23

SEQ ID NO: 218         moltype = AA  length = 26
FEATURE                Location/Qualifiers
source                 1..26
                       mol_type = protein
                       organism = Gallus gallus
SEQUENCE: 218
SAAVGSILSE EGVPISSGGF GISGLG                                               26

SEQ ID NO: 219         moltype = AA  length = 24
FEATURE                Location/Qualifiers
source                 1..24
                       mol_type = protein
                       organism = Gallus gallus
SEQUENCE: 219
SILSEEGVPI SSGGFGISGL GSRF                                                 24

SEQ ID NO: 220         moltype = AA  length = 24
FEATURE                Location/Qualifiers
source                 1..24
                       mol_type = protein
                       organism = Gallus gallus
SEQUENCE: 220
PSPVVVTLPG PILSSFPQNT AVGS                                                 24

SEQ ID NO: 221         moltype = AA  length = 23
FEATURE                Location/Qualifiers
source                 1..23
                       mol_type = protein
                       organism = Gallus gallus
SEQUENCE: 221
VVIQPSPVVV TLPGPILSSF PQN                                                  23

SEQ ID NO: 222         moltype = AA  length = 23
FEATURE                Location/Qualifiers
source                 1..23
                       mol_type = protein
                       organism = Gallus gallus
SEQUENCE: 222
SRVVIQPSPV VVTLPGPILS SFP                                                  23
```

```
SEQ ID NO: 223         moltype = AA  length = 24
FEATURE                Location/Qualifiers
source                 1..24
                       mol_type = protein
                       organism = Gallus gallus
SEQUENCE: 223
SSVAIQPPPV VVTLPGPILS SFPQ                                          24

SEQ ID NO: 224         moltype = AA  length = 23
FEATURE                Location/Qualifiers
source                 1..23
                       mol_type = protein
                       organism = Gallus gallus
SEQUENCE: 224
RVVIQPSPVV VTLPGPILSS FPQ                                           23

SEQ ID NO: 225         moltype = AA  length = 25
FEATURE                Location/Qualifiers
source                 1..25
                       mol_type = protein
                       organism = Gallus gallus
SEQUENCE: 225
SILSEEGVPI SSGGFGISGL GSRFS                                         25

SEQ ID NO: 226         moltype = AA  length = 27
FEATURE                Location/Qualifiers
source                 1..27
                       mol_type = protein
                       organism = Gallus gallus
SEQUENCE: 226
TSAAVGSILS EEGVPISSGG FGISGLG                                       27

SEQ ID NO: 227         moltype = AA  length = 26
FEATURE                Location/Qualifiers
source                 1..26
                       mol_type = protein
                       organism = Gallus gallus
SEQUENCE: 227
SILSEEGVPI SSGGFGISGL GSRFSG                                        26

SEQ ID NO: 228         moltype = AA  length = 24
FEATURE                Location/Qualifiers
source                 1..24
                       mol_type = protein
                       organism = Gallus gallus
SEQUENCE: 228
SRVVIQPSPV VVTLPGPILS SFPQ                                          24

SEQ ID NO: 229         moltype = AA  length = 28
FEATURE                Location/Qualifiers
source                 1..28
                       mol_type = protein
                       organism = Gallus gallus
SEQUENCE: 229
TAVGSSTSAA VGSILSEEGV PISSGGFG                                      28

SEQ ID NO: 230         moltype = AA  length = 28
FEATURE                Location/Qualifiers
source                 1..28
                       mol_type = protein
                       organism = Gallus gallus
SEQUENCE: 230
STSAAVGSIL SEEGVPISSG GFGISGLG                                      28

SEQ ID NO: 231         moltype = AA  length = 24
FEATURE                Location/Qualifiers
source                 1..24
                       mol_type = protein
                       organism = Gallus gallus
SEQUENCE: 231
RVVIQPSPVV VTLPGPILSS FPQN                                          24

SEQ ID NO: 232         moltype = AA  length = 25
FEATURE                Location/Qualifiers
source                 1..25
                       mol_type = protein
                       organism = Gallus gallus
SEQUENCE: 232
SRVVIQPSPV VVTLPGPILS SFPQN                                         25
```

```
SEQ ID NO: 233          moltype = AA  length = 25
FEATURE                Location/Qualifiers
source                 1..25
                       mol_type = protein
                       organism = Gallus gallus
SEQUENCE: 233
DSRVVIQPSP VVVTLPGPIL SSFPQ                                        25

SEQ ID NO: 234          moltype = AA  length = 29
FEATURE                Location/Qualifiers
source                 1..29
                       mol_type = protein
                       organism = Gallus gallus
SEQUENCE: 234
TAVGSSTSAA VGSILSEEGV PISSGGFGI                                    29

SEQ ID NO: 235          moltype = AA  length = 29
FEATURE                Location/Qualifiers
source                 1..29
                       mol_type = protein
                       organism = Gallus gallus
SEQUENCE: 235
SAAVGSILSE EGVPISSGGF GISGLGSRF                                    29

SEQ ID NO: 236          moltype = AA  length = 24
FEATURE                Location/Qualifiers
source                 1..24
                       mol_type = protein
                       organism = Gallus gallus
SEQUENCE: 236
VEQLVNLQHL DVAYNLLLEH AQLA                                         24

SEQ ID NO: 237          moltype = AA  length = 28
FEATURE                Location/Qualifiers
source                 1..28
                       mol_type = protein
                       organism = Gallus gallus
SEQUENCE: 237
SVAIQPPPVV VTLPGPILSS FPQSTAVG                                     28

SEQ ID NO: 238          moltype = AA  length = 28
FEATURE                Location/Qualifiers
source                 1..28
                       mol_type = protein
                       organism = Gallus gallus
SEQUENCE: 238
SILSEEGVPI SSGGFGISGL GSRFSGRR                                     28

SEQ ID NO: 239          moltype = AA  length = 30
FEATURE                Location/Qualifiers
source                 1..30
                       mol_type = protein
                       organism = Gallus gallus
SEQUENCE: 239
TSAAVGSILS EEGVPISSGG FGISGLGSRF                                   30

SEQ ID NO: 240          moltype = AA  length = 29
FEATURE                Location/Qualifiers
source                 1..29
                       mol_type = protein
                       organism = Gallus gallus
SEQUENCE: 240
SSVAIQPPPV VVTLPGPILS SFPQSTAVG                                    29

SEQ ID NO: 241          moltype = AA  length = 31
FEATURE                Location/Qualifiers
source                 1..31
                       mol_type = protein
                       organism = Gallus gallus
SEQUENCE: 241
STSAAVGSIL SEEGVPISSG GFGISGLGSR F                                 31

SEQ ID NO: 242          moltype = AA  length = 31
FEATURE                Location/Qualifiers
source                 1..31
                       mol_type = protein
                       organism = Gallus gallus
```

```
SEQUENCE: 242
PSPVVVTLPG PILSSFPQNT AVGSSTSAAV G                    31

SEQ ID NO: 243         moltype = AA  length = 33
FEATURE                Location/Qualifiers
source                 1..33
                       mol_type = protein
                       organism = Gallus gallus
SEQUENCE: 243
TAVGSSTSAA VGSILSEEGV PISSGGFGIS GLG                  33

SEQ ID NO: 244         moltype = AA  length = 31
FEATURE                Location/Qualifiers
source                 1..31
                       mol_type = protein
                       organism = Gallus gallus
SEQUENCE: 244
AVGSILSEEG VPISSGGFGI SGLGSRFSGR R                    31

SEQ ID NO: 245         moltype = AA  length = 27
FEATURE                Location/Qualifiers
source                 1..27
                       mol_type = protein
                       organism = Gallus gallus
SEQUENCE: 245
NKVLVHCAMG RSRSATLVLA YLMIYKN                         27

SEQ ID NO: 246         moltype = AA  length = 32
FEATURE                Location/Qualifiers
source                 1..32
                       mol_type = protein
                       organism = Gallus gallus
SEQUENCE: 246
SSVAIQPPPV VVTLPGPILS SFPQSTAVGS TA                   32

SEQ ID NO: 247         moltype = AA  length = 32
FEATURE                Location/Qualifiers
source                 1..32
                       mol_type = protein
                       organism = Gallus gallus
SEQUENCE: 247
AAVGSILSEE GVPISSGGFG ISGLGSRFSG RR                   32

SEQ ID NO: 248         moltype = AA  length = 35
FEATURE                Location/Qualifiers
source                 1..35
                       mol_type = protein
                       organism = Gallus gallus
SEQUENCE: 248
TAVGSSTSAA VGSILSEEGV PISSGGFGIS GLGSR                35

SEQ ID NO: 249         moltype = AA  length = 33
FEATURE                Location/Qualifiers
source                 1..33
                       mol_type = protein
                       organism = Gallus gallus
SEQUENCE: 249
SAAVGSILSE EGVPISSGGF GISGLGSRFS GRR                  33

SEQ ID NO: 250         moltype = AA  length = 34
FEATURE                Location/Qualifiers
source                 1..34
                       mol_type = protein
                       organism = Gallus gallus
SEQUENCE: 250
PSPVVVTLPG PILSSFPQNT AVGSSTSAAV GSIL                 34

SEQ ID NO: 251         moltype = AA  length = 35
FEATURE                Location/Qualifiers
source                 1..35
                       mol_type = protein
                       organism = Gallus gallus
SEQUENCE: 251
PSPVVVTLPG PILSSFPQNT AVGSSTSAAV GSILS                35

SEQ ID NO: 252         moltype = AA  length = 36
FEATURE                Location/Qualifiers
```

-continued

```
source                  1..36
                        mol_type = protein
                        organism = Gallus gallus
SEQUENCE: 252
TAVGSSTSAA VGSILSEEGV PISSGGFGIS GLGSRF                              36

SEQ ID NO: 253          moltype = AA  length = 29
FEATURE                 Location/Qualifiers
source                  1..29
                        mol_type = protein
                        organism = Gallus gallus
SEQUENCE: 253
RPRVYLHCTN PRHPKYREGD VTLFALNLS                                      29
```